June 14, 1938.  H. DIAMOND ET AL  2,120,241
RADIO GUIDANCE OF AIRCRAFT
Filed Aug. 26, 1935   5 Sheets-Sheet 3

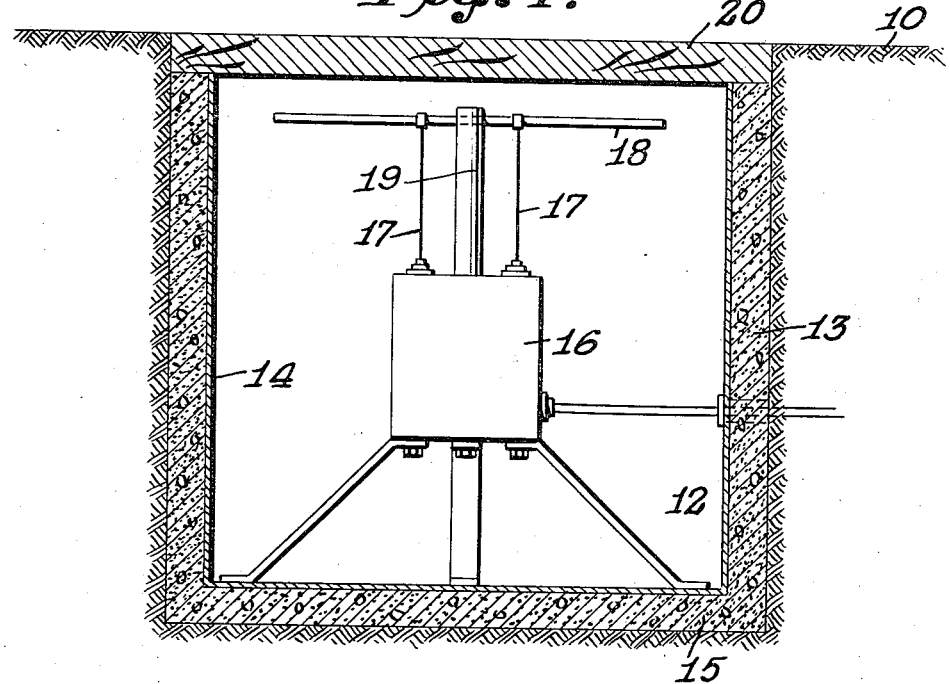
Fig. 1.
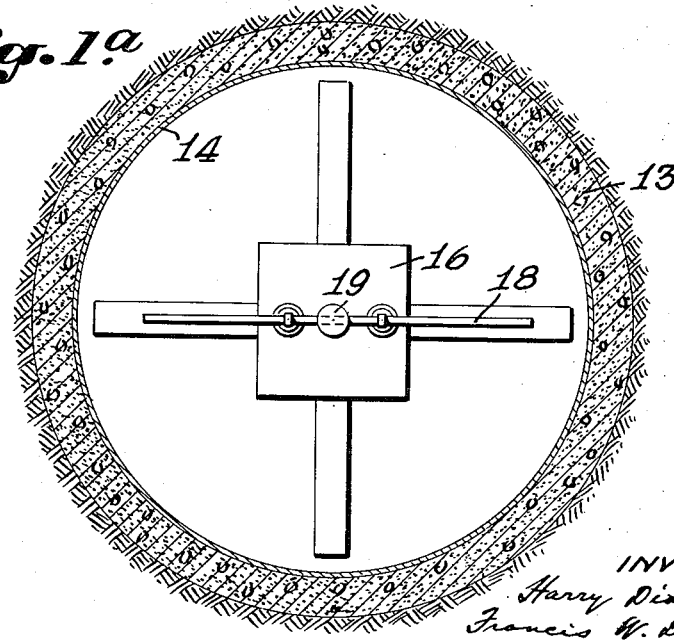
Fig. 1ª.
INVENTORS
Harry Diamond &
Francis W. Dunmore
BY J. Motherhead
ATTORNEY

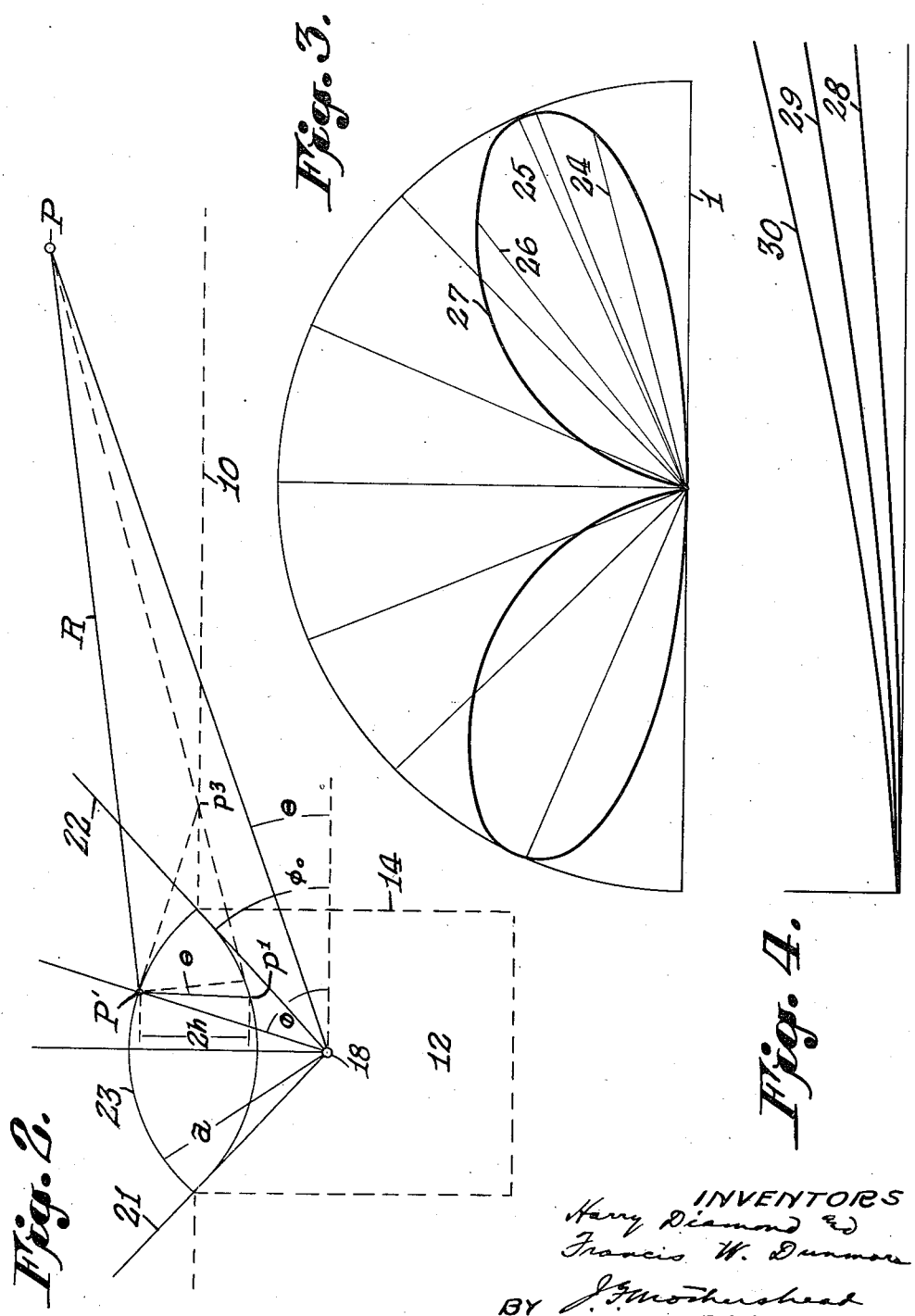

INVENTORS
Harry Diamond &
Francis W. Dunmore
BY J. F. Mothershead
ATTORNEY

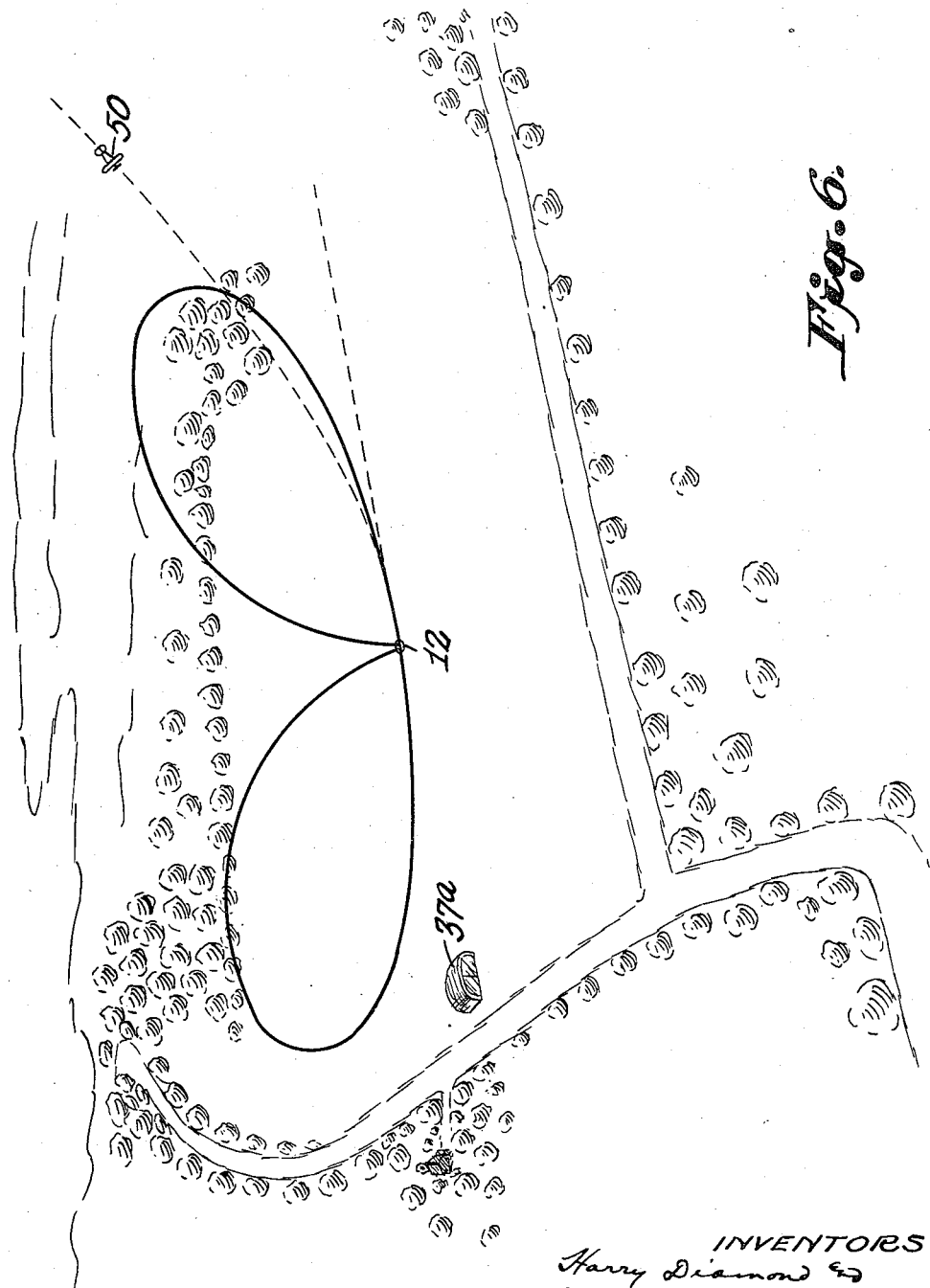

Patented June 14, 1938

2,120,241

UNITED STATES PATENT OFFICE 2,120,241

RADIO GUIDANCE OF AIRCRAFT

Harry Diamond and Francis W. Dunmore, Washington, D. C., assignors to the Government of the United States as represented by the Secretary of Commerce Application August 26, 1935, Serial No. 37,930

6 Claims. (Cl. 250—11)

(Granted under the act of March 3, 1883, as amended April 30, 1928; 370 O. G. 757)

The invention described herein may be manufactured and used by or for the Government of the United States for governmental purposes without the payment of any royalty thereon.

This invention relates to a method and apparatus for the emission of a "so-called" landing beam from a point underground for the purpose of guiding an aircraft when landing in fog, or, conversely, when "taking-off".

The method and apparatus hitherto employed in utilizing the landing beam have been positioned above ground, and are described in the copending application, Serial No. 627,625, filed August 5, 1932, by one of the joint inventors of the present invention, F. W. Dunmore.

The practicability of the use of the landing beam has already been demonstrated by many blind landings using installations at airports located at College Park, Md., Newark, N. J., and Oakland, California.

As a result of these uses, the need became apparent for means of serving all wind directions with a single apparatus or landing beam installation and the need for better control over the steepness of the landing path corresponding to a proper point of contact of the landing airplane along the airport runway.

An object of the invention is the method of radiating electrical energy for producing guidance for aircraft which includes placing a source of energy below the surface of the landing field or landing area, and dimensioning the pit or container containing said source of energy to produce a wave front immediately above the pit which is the equivalent to the behavior of said source of energy, if placed above the surface of the ground or area, in producing a radio landing path for the vertical guidance of aircraft.

Another object of our invention is to provide a means of vertical guidance with its source underground and so positioned on the landing area as to serve all wind directions from a single source and such that for each direction a landing path of desired steepness may be had corresponding to a point of contact at a proper location on the landing field.

Previous to our invention a multiplicity of landing beam transmitters were required to serve all wind directions, it being necessary to locate the transmitting apparatus at points off the field near the opposite ends of the field from the approach directions. Since the equation of the landing path is approximately a parabola and the particular parobola used corresponding to a given point of contact is determined by the two points through which it must pass (one the point of zero elevation at the transmitter and the second the elevation of the receiving antenna on the airplane when its landing wheels contact the airport surface) such locations (especially when large fields were involved) produced much too flat a landing path if the point of contact was to be kept on the approach side of the center of the field. By moving the landing transmitting equipment up to the center of the field as our invention makes possible without constituting a hazard to flight operations on the airport, and locating it in the correct position in a properly constructed pit we have found it possible to serve all wind directions as well as to produce a landing path of any desired steepness yet keeping the point of contact on the approach side of the center of the field. The latter feature permits full utilization of the runway for rolling to a stop after the airplane has contacted the ground.

Other features of our invention will be apparent from the following detailed description and the accompanying drawings.

It is to be expressly understood, however, that these drawings are for the purposes of illustration only and are not designed for a definition of the limits of our invention. Referring to the illustrations in the drawings:

Figure 1 shows the landing beam transmitting equipment located in a shielded pit;

Figure 1a is a top plan view of Figure 1 with the cover removed;

Figure 2 is a diagrammatic view showing the underlying principles of operation of the arrangement shown in Figure 1;

Figure 3 is a polar diagram showing the vertical distribution of the radiated energy which we utilize;

Figure 4 shows typical lines of constant field intensity for the polar diagram in Figure 3, any one of which may be used as a landing path;

Figure 6 is a perspective view showing a ground arrangement of an airport equipped with the present invention, illustrated in Figures 1 to 5, inclusive, and showing the directive characteristics in the vertical planes of space patterns for providing vertical guidance in the aircraft;

Figure 7:
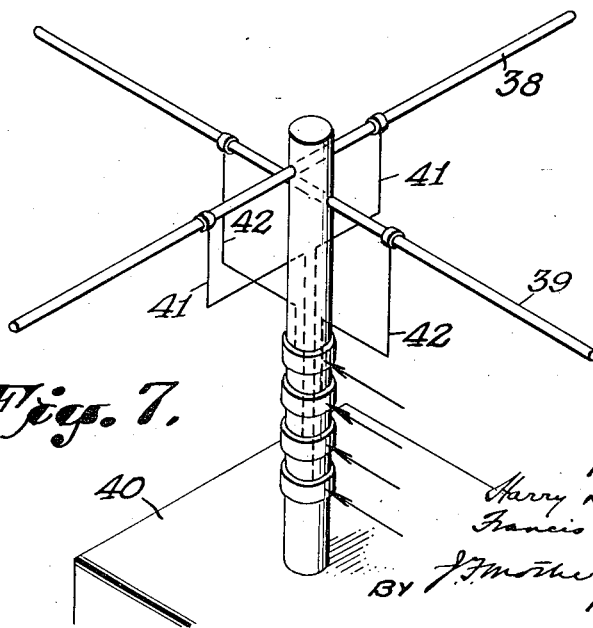
Figure 8:
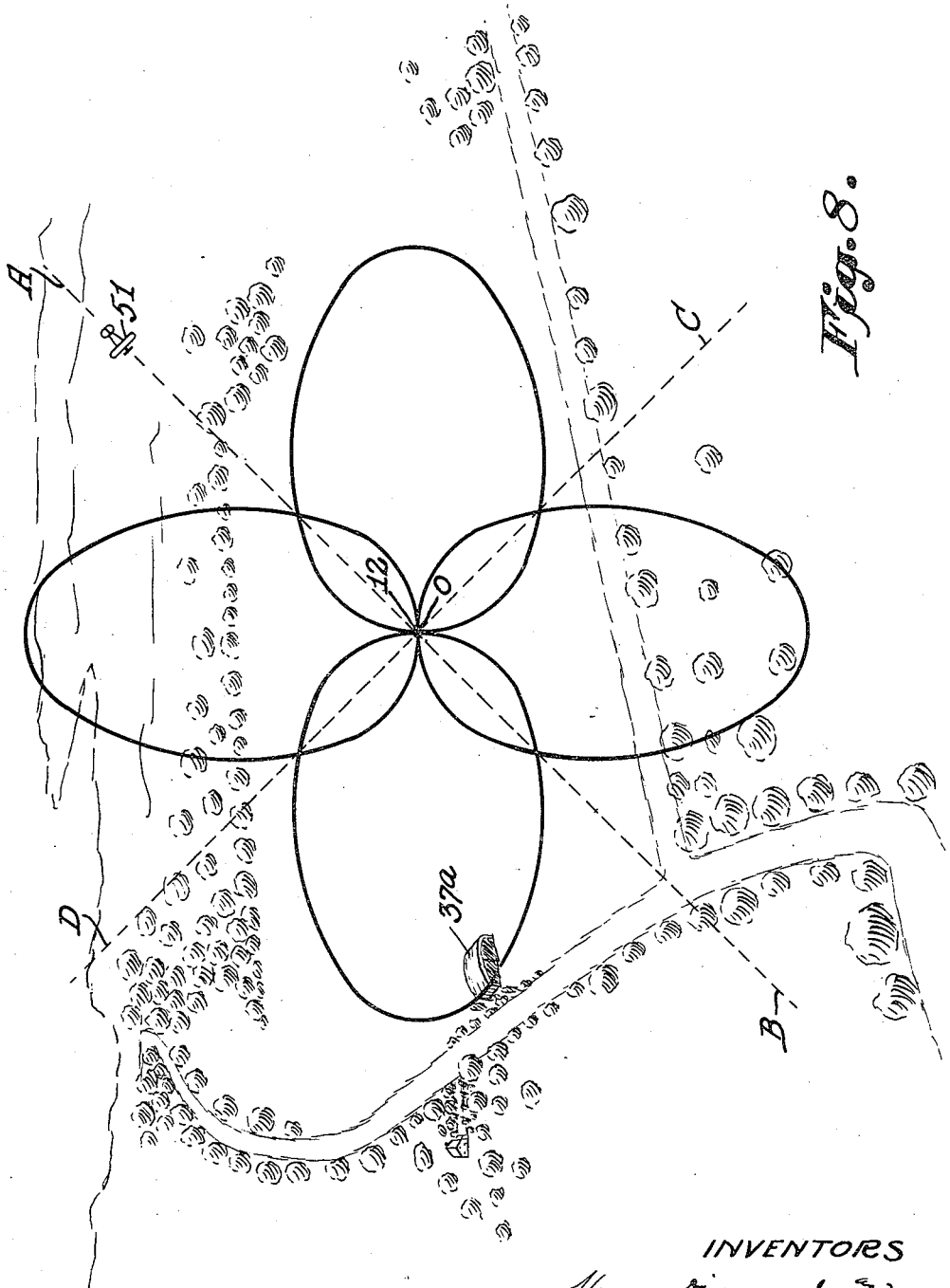

Figure 7 shows the application of the present invention for the production of combined runway beacon and landing beam signals (similarly as disclosed in the copending application Serial No. 704,115, of one of the joint inventors of the present invention, Harry Diamond, whereby the planes of intersection of the space patterns of the two crossed antennas may be used as equisignal zones for the lateral guidance of landing airplanes and lines of constant field intensity in these planes for vertical guidance; and Figure 8 is a perspective view showing a ground arrangement of an airport equipped with the device illustrated in Figure 7, and further showing the directive characteristics for giving horizontal or lateral guidance to the landing airplane, the vertical guidance being given in the same manner as shown in Figure 6.

Referring to the drawings more in detail, in Fig. 1, 10 denotes the ground level, 12 is the pit with reenforced waterproof wall 13 and bottom 15. The wall 13 and bottom 15 are lined inside with a metallic shield 14. The landing beam transmitting equipment is contained in the shielded box 16. Transmission lines 17 feed the half-wave doublet antenna 18, which is supported by an insulated rod 19 which may be either in the side or on the top of said shielded box 16. The top of the pit is covered with wooden planks 20 waterproofed with nonconducting material.

The antenna 18 should be approximately one-half wave length above the bottom 15 of the pit and a distance below the ground level 10 preferably of an optimum value to be derived later in this specification. The pit is preferably round and may be of about ¾ wave length in diameter.

In Fig. 2 the principle of operation of our invention is shown. Here the radiating doublet antenna 18 is in a pit 12 with sides shielded with metal 14. The doublet is located about ½ wave length from the bottom of the pit and say $\frac{1}{18}$ wave length below the ground surface 10.

We have discovered that moving the position of the antenna from about the ground surface into a pit down to about 45 centimeters below the ground level produced but small decrease of the received signal at a point 200 feet or more distant from the pit and caused practically no change in the relative vertical distribution of intensity (up to 5 degrees elevation). Again, with the antenna in the pit, a marked change in the water content in the surrounding ground and also shielding the walls of the pit, introduced no appreciable change in either the intensity of received signal at a distant point or its vertical distribution. The fact that the shape of a given line of constant field intensity is so very nearly the same for the transmitting antenna in the pit under the various conditions cited as that for the case of the transmitting antenna above ground depends upon the ground reflection of the rays diffracted around the edge of the pit. An explanation of this discovery may be made as follows:

Referring to Fig. 2, the transmitting antenna 18 may be considered to be an infinitely long wire, with uniform current distribution, perpendicular to the plane of the paper. The marginal rays 21 and 22 of the wave emerging through the surface of the pit makes angles with the ground surface equal respective to $\phi_0$ and $\pi - \phi_0$. The wave front 23 may be considered to be cylindrical in shape, an assumption which is quite valid since we are interested only in the field produced at points substantially perpendicular to the antenna (such as point P) and only in the horizontal electric field component at these points. Consider the point P at an angle $\theta$ above the horizontal. By Huyghen's principle, each element of the wave front 23, P' (at an angle $\phi$ with the horizontal), becomes a new source and radiates energy in all directions. Part of this energy reaches the point P directly along the path R while part reaches it by reflection from the ground along the path P'P₃P. The latter appears to come from the virtual image of P' located at $p^1$, directly below P' by a distance $$2h = 2a(\sin \phi - \sin \phi_0) \quad (1)$$

where $a$ is the radius of the wave front about the transmitting antenna 18. It is possible to assume an image under the general point P' even though the surface of the reflecting plane is cut away from below it, since, for the angles of $\theta$ involved, the actual reflecting point P₃ always falls beyond the rim of the pit. The intensity at P due to the two rays from P' may then be set up in terms of the various distances and angles indicated on Fig. 2, and summed up for all the elementary points on the wave front between the limits of the marginal rays as indicated in the following expression $$E_P = A\sqrt{\frac{a}{r}} \int_{\phi_0}^{\pi - \phi_0} \{1 + \cos \phi\} \left\{ \sin w\left[t - \frac{a+R}{V}\right] - \sin w\left[t - \frac{a+R'}{V}\right] \right\} d\phi \quad (2)$$

where $1 + \cos \phi$ is the Stokes' obliquity factor taking into account that the new wavelet at P' tends to be propagated with maximum effect in the direction of propagation of the original wave front at this point.

$$\frac{a+R}{V}$$

is the phase retardation with respect to the phase at the antenna of the wave reaching P along the path R.

$$\frac{a+R'}{V}$$

is the phase retardation of the wave reaching P via P'P₃P=R'. The negative sign is taken before this term to indicate a negative image.

Placing $$R = r - \frac{R' - R}{2}$$

and $$R' = r + \frac{R' - R}{2}$$

we may write from (1) and from the fact that $R' = R + P_1P_2 = R + 2h \sin \theta$ approx.

$$\begin{aligned} R &= r - a \sin \theta (\sin \phi - \sin \phi_0) \\ R' &= r + a \sin \theta (\sin \phi - \sin \phi_0) \end{aligned} \quad (3)$$

Substituting (3) in (2), we have $$E_p = A\sqrt{\frac{a}{r}} \int_{\phi_0}^{\pi - \phi_0} \{1 + \cos \phi\}$$
$$\left\{ \sin w\left(t - \frac{a+r}{V} + \frac{a \sin \theta (\sin \phi - \sin \phi_0)}{V}\right) - \sin w\left(t - \frac{a+r}{V} - \frac{a \sin \theta (\sin \phi - \sin \phi_0)}{V}\right) \right\} d\phi \quad (4)$$

Simplifying $$E_p = 2A\sqrt{\frac{a}{r}} \cos w\left(t - \frac{a+r}{V}\right) \int_{\phi_0}^{\pi - \phi_0} \{1 + \cos \phi\}$$
$$\left\{ \sin\left[\frac{wa}{V} \sin \theta (\sin \phi - \sin \phi_0)\right] \right\} d\phi \quad (5)$$

But since $\theta$ is small $$\sin\left[\frac{wa}{V} \sin \theta (\sin \phi - \sin \phi_0)\right] = \frac{wa}{V} \sin \theta (\sin \phi - \sin \phi_0)$$

Also $$\frac{wa}{V} = \frac{2\pi a}{\lambda}$$

Therefore $$E_p = \frac{4\pi A a \sqrt{a}}{\lambda \sqrt{r}} \cos w\left(t - \frac{a+r}{V}\right)$$
$$\sin \theta \int_{\phi_0}^{\pi - \phi_0} (1 + \cos \phi)(\sin \phi - \sin \phi_0) d\phi \quad (6)$$

Integrating $$E_p = \frac{4\pi A a \sqrt{a}}{\lambda \sqrt{r}} \{2 \cos \phi_0 - (\pi - 2\phi_0) \sin \phi_0\}$$
$$\sin \theta \cos w\left(t - \frac{a+r}{V}\right) \quad (7)$$

Equation (7) gives the field intensity at the point P in terms of the angle of elevation $\theta$, the dimensions of the pit, and the wave length in air. For a pit of given dimensions and with the antenna in a given position, equation (7) resolves into $$E_p = C \sin \theta \cos 2\pi \left(t - \frac{a+r}{V}\right) \quad (8)$$

The latter equation indicates that the intensity at the point P is a sine function of the angle of elevation of the point P. Since for small angles, $\sin \theta = \theta$, the vertical distribution of intensity is seen to be a linear function of the height.

In our experiments, we obtained a square law function. However, the receiver used was of a special type employing two detectors and having very nearly a square law relation of its output and input. Our experimental data therefore are in agreement with equation (8). This is the same type of vertical distribution of intensity as is obtained with a transmitting antenna above ground, and is suitable for setting up a landing path such as described in the copending application, Serial No. 627,625, filed Aug. 5, 1932 by F. W. Dunmore.

Equation (7) gives practically all the necessary design details for successful use of the landing beam transmitting antenna in a pit at the center of an airport. The first term indicates that for a given antenna location in the pit, the intensity P, at a distant receiving point, increases with the opening of the pit (i. e. with its diameter) and decreases with an increase in the wave length used. The second (bracketed) term of (7) shows that for a given pit diameter, the intensity at P is a function of the angle of the marginal ray; i. e. of the depth of the antenna in the pit. A study of this term discloses that the intensity is large for small angles of $\phi_0$ and decreases as $\phi_0$ is increased becoming zero for $$\phi_0 = \frac{\pi}{2}$$

The third term in (7) gives the relation of the intensity with the angle of elevation of the receiving point while the fourth term indicates the phase of the resultant field at the receiving point.

From the foregoing analysis, it becomes apparent why the path of a line of constant field intensity is of very nearly the same shape with the transmitting antenna in the pit as for the antenna a short distance above the ground surface. The wave front in emerging from the pit is equivalent to a physical antenna above the ground surface, so that the phenomena of interference between a direct and reflected wave may occur.

We have found that the energy distribution in these rays in the vertical plane may be represented by the polar diagram shown in Fig. 3, wherein the radii 24, 25, 26, etc., represent angular directions of elevation with respect to the airport surface and the lengths of these radii represent the relative intensities of the radiations corresponding to the different directions. This type of radiation diagram 27 is characterized by a family of lines of constant intensity 28, 29, 30, etc., such as shown in Fig. 4, any one of which may be used as a landing path.

The reason for specifying the position of the radiating doublet antenna as approximately $\frac{1}{16}$ wave length below the top of the pit (the ground level) and $\frac{1}{2}$ wave length above the bottom of the pit may now be explained. The distance below the top of the pit (corresponding to $\frac{1}{16}$ wave length for the order of wave lengths used for the landing beam, say 3 meters) is sufficient to permit the use of heavy top planks over which the landing airplane may roll upon passing the center of the field, and still gives an intensity of radiation practically equal to that for an antenna a short distance above the ground. The value of $\frac{1}{2}$ wave length above the bottom of the pit is to minimize the radiation of an extraneous vertically polarized electric field component which we found to be present.

Since we use a horizontal receiving antenna on the airplane to receive the normal horizontally polarized electric field component radiated from the horizontal transmitting antenna, there is a twofold reason for minimizing the extraneous vertically-polarized component. Firstly, such a component results in a tilt of the plane of polarization of the total electric field, so that tilting of the airplane receiving antenna (due to tilting of the airplane during normal flight) results in different readings of the landing path indicator depending on whether the airplane tilts to one side or the other. Secondly, since the vertical component is not useful, it represents an actual waste of energy. We have found that by locating the radiating antenna one-half wave length above the bottom of the pit, the latter acts as a reflecting surface and the reflected vertically-polarized electric field cancels in considerable degree the direct radiation component of this field, leaving a maximum of useful horizontally-polarized electric field component.

Figure 5:
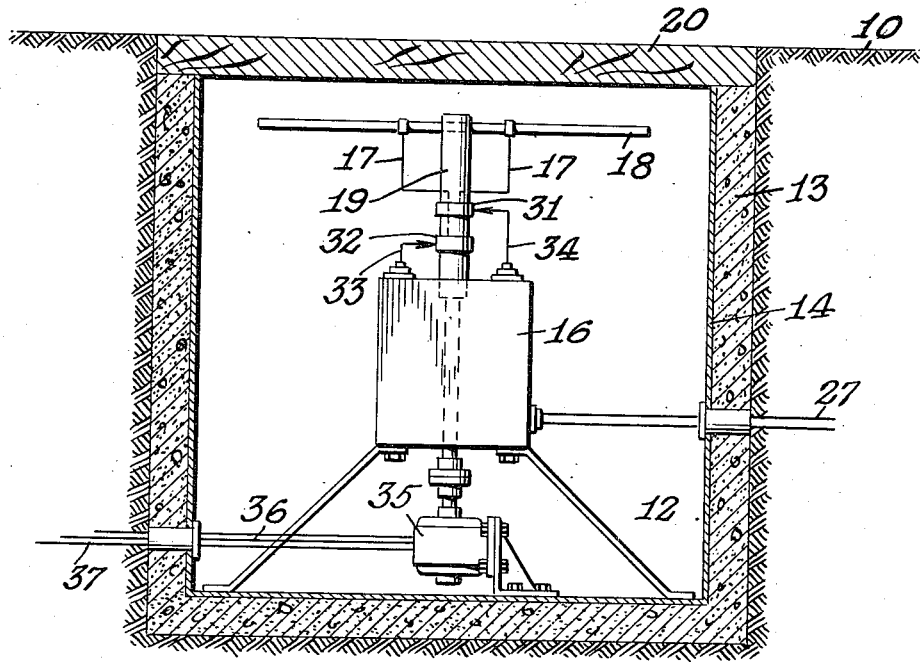
Figure 5 shows a method of orienting the landing beam to serve any wind direction.

Referring to Fig. 5, we show one method of orienting the landing beam signal in any desired direction so that the landing airplane may be headed into the wind. Here 10 is the airport ground surface, 12 the pit located preferably at the center of the airport as shown in Fig. 6, 13 the waterproofing and 14 the metallic shielding. The radiating doublet antenna is carried on a vertical rotating shaft 19. The doublet antenna is excited from the ultra-high-frequency oscillator housed in the shielded box 16 by means of transmission lines 17, slip rings and brushes 31 and 32, and ends 33 and 34. Shaft 19 connects to a control motor 35 with control lines 36 leading into the underground conduit 37 which goes to the airport control tower 37a. In this way an operator in the tower may vary the orientation of the radiating antenna by any predetermined amount up to 360 degrees.

The oscillator inclosed in the shielded box 16 and having its output connected to terminals 33 and 34 is of the conventional type used for landing beam work and is therefore not described here.

The improvement introduced in the shape of the landing path by our invention will be evidenced from the following example: Assume a 5000 foot landing field runway and the landing beam transmitter located in a pit 12 in the center of the field, as shown in Fig. 6. Assume also that the landing beam receiver carried on the landing airplane 50 is adjusted in sensitivity to give a point of contact 800 feet from the center of the field (on the approach side). The landing path is then such that the airplane is 950 feet high when 2 miles distant from the field. However, if the transmitter is moved to the far edge of the field, as has been necessary heretofore, and the receiving set sensitivity is adjusted to give the same point of contact as before, the landing path will be such that the airplane is only 125 feet high when 2 miles from the field. This gives much too flat a glide path with danger of collision with obstructions along the approach. If the receiver sensitivity is decreased to give a safe height at 2 miles for this latter case, the point of contact would be moved dangerously near the far edge of the field.

We have found that with the transmitting equipment located in a pit in the center of a 5000 foot field, practically any desired steepness of path may be had by properly setting the receiving set sensitivity or adjusting the radiated power at the transmitter. For example, if the point of contact is 1300 feet from the center of the field (on the approach side) the path will be such that the airplane is 400 feet high when 2 miles from the field. By changing the receiver or transmitter so that the path is such that the airplane will be 950 feet high when 2 miles from the field the point of contact will still be at a safe point, namely, 800 feet from the center of the field on the approach side. We have thus provided a remarkable flexibility in the steepness of approach possible, while at the same time making maximum use of the length of the landing runway for rolling after the airplane has contacted the ground.

By locating the landing beam transmitting equipment and radiating means in a waterproofed electrically-shielded pit we prevent any outside influence such as water content in the ground from influencing the shape of the landing path. The wave front emerging from the pit is equivalent to a physical antenna above the ground surface so that the phenomenon of interference between a direct and reflected ray may occur. Thus we have discovered a novel way of producing a landing path. It has been considered impossible heretofore to produce a landing beam from a transmitter in a pit; firstly, because of absorption of the ultra high frequency radiation while passing through the ground, and secondly, because it was thought the reflection phenomena (involved in producing a landing path when the transmitter is above ground) could not take place. We have utilized a new phenomenon for producing the same effect.

The present invention is also useful in the radio landing system described in the copending application, Serial No. 704,115, filed Dec. 27, 1933, by one of the joint inventors of the present invention, Harry Diamond. In the application referred to, two radio landing beams crossed at an angle are employed. The two beams are of the same radio frequency but characterized by different modulations or characteristic codings, so that their plane of intersection may be used as an equisignal zone for the lateral guidance of a landing airplane while the lines of constant field intensity in this plane may be used as landing paths for the vertical guidance of said airplane.

Referring to Fig. 7, two half-wave transmitting antennas, 38 and 39, are employed crossed at an angle, say 90 degrees. These are located in the pit 12 in the center of the field as in the case of use of a single antenna. Two separate oscillators may be used, placed in the shielded box 40, operating at the same ultra high radio frequency but having distinctive tone modulations or characteristic codings. One of these feeds power to antenna 38 by means of transmission lines 41 and the second feeds power to antenna 39 by means of transmission lines 42. The trace of the space pattern produced by the two antennas projected on the ground surface consists of two figures-of-eight intersecting at right angles as illustrated in Fig. 8. The planes of intersection of these two figures-of-eight projected on the ground surface produce the traces OA, OB, OC and OD. These are equisignal lines and may be oriented along four perpendicular approaches to the airport so that a landing airplane may use the radio signals for lateral guidance along these approaches. In the vertical plane, the cross-section of the space pattern which produces the trace AOB or COD is as shown by Fig. 3, so that lines of constant field intensity in the equisignal planes may be used as landing paths for the vertical guidance of a landing airplane coming in along any one of the four perpendicular approaches to the airport.

The foregoing description comprehends only a general and preferred embodiment of our invention and changes in our method and in details of our apparatus may be made within the scope of those claims which may be allowed. These claims are therefore not intended as restricted to the specific details of our invention as disclosed herein.

What we claim is:

1. In an ultra high frequency transmission system, a source of ultra high frequency, means for supplying output of said source of ultra high frequency to directive radiating means, said directive radiating means being orientable to serve different directions in an azimuthal plane and being located in a container with sides and bottom shielded and its top covered with non-shielding material, said container being buried in a landing surface with said top flush with said landing surface; so that a portion of the energy emerging through the top of the container from the radiating means is repropagated azimuthally above the top edge of the container and defines a course along the selected approach to said landing surface which provides vertical guidance for aircraft.

2. In an ultra high frequency transmission system, a source of ultra high radio frequency, directive radiating means remotely controllable to serve different directions in an azimuthal plane, means for supplying energy from said source to said radiating means, a pit having a depth somewhat in excess of an even multiple of a quarter of the wave-length output of said radiating means, said pit having a breadth not materially less than twelve times the amount of said excess, said pit being located in a landing surface and having its top covered over with non-shielding material lying substantially flush with the landing surface and capable of supporting the weight of a superposed load, and said radiating means being located in said pit at the said excess portion of its depth below its top; whereby a portion of the energy emerging from the top of the pit is repropagated azimuthally and defines a course along the selected approach to said landing surface which provides vertical guidance for aircraft.

3. In an ultra high frequency transmitting system means for producing two ultra high frequency waves of exactly the same carrier frequency, means for producing on each of said carrier waves a distinguishing characteristic, means for transferring said carrier waves with said distinguishing characteristics to associated antenna systems located below a landing surface, said antenna systems focusing said carrier waves with differing characteristics in the form of beams with said distinguishing characteristics, said system providing azimuthal repropagation of energy of said beams emerging above said landing surface, and associated means for orienting said repropagated radio beams whereby a line of constant field intensity below the axis of the equisignal surface formed by the intersection of two repropagated beams will define a suitable landing path coinciding with a selected approach to said landing surface.

4. In an ultra high frequency transmission system a source of ultra high frequency, means for supplying a portion of said source of ultra high frequency to a directive radiating means orientable in an azimuthal plane and means for impressing a distinctive characteristic to the radiant energy from said radiating means, additional means for supplying a portion of said source of ultra high frequency to a second directive radiating means oriented at an angle to said first radiating means and orientable in an azimuthal plane with said first radiating means and means for impressing a distinctive characteristic different from said first distinctive characteristic, to the radiant energy from said second radiating means, said first and second radiating means being located in a container with sides and bottom shielded and its top covered with non-shielding material, said container being buried in a landing surface with said top flush with said landing surface; such that a portion of the energy emerging through the top of the container from the two radiating means is repropagated azimuthally above the top edge of the container and defines a course along any selected approach to said landing surface which provides both lateral and vertical guidance for landing aircraft.

5. A system for producing generally azimuthally directed signals of the class described exemplified by a pit about three-fourths of a wave length in diameter and about nine-sixteenths of a wave length in depth, said pit having its sides and bottom shielded, with a horizontal doublet antenna about one-half a wave length long located in said pit at a distance of about one-sixteenth of a wave length from its top, whereby a generally azimuthally directed signal is propagated on energization of said doublet at a frequency corresponding to one wave-length.

6. In an ultra high frequency transmission system, a source of ultra high radio frequency, a directive radiating means remotely orientable in an azimuthal plane, means for supplying energy from said source to said radiating means, a container having a breadth of about three-fourths of the wave length output of said radiating means, said radiating means located in said container at about one-sixteenth of a wave-length below its top, the top of said container being substantially flush with a landing surface, whereby a portion of the energy from said source of ultra high frequency is diffracted about the top edge of said container and defines a course along any selected approach to said landing surface providing vertical guidance for landing aircraft.

HARRY DIAMOND.
FRANCIS W. DUNMORE.